United States Patent [19]
Klann

[11] 3,795,170
[45] Mar. 5, 1974

[54] CHEST VALVE FOR PIPE ORGANS

[76] Inventor: Paul A. Klann, P.O. Box 2398, Waynesboro, Va. 22981

[22] Filed: Dec. 29, 1972

[21] Appl. No.: 319,813

Related U.S. Application Data

[63] Continuation-in-part of Ser. No. 152,304, June 11, 1971, abandoned.

[52] U.S. Cl. .................................................. 84/339
[51] Int. Cl. ............................................ G10b 3/10
[58] Field of Search .............. 84/335–336, 338–339

[56] References Cited
UNITED STATES PATENTS

| | | | |
|---|---|---|---|
| 1,823,775 | 9/1931 | Adams et al. | 84/339 |
| 1,188,851 | 6/1916 | Smith | 84/335 |
| 560,559 | 5/1896 | Wirsching | 84/336 X |

*Primary Examiner*—Lawrence R. Franklin
*Attorney, Agent, or Firm*—Sughrue, Rothwell, Mion, Zinn & Macpeak

[57] ABSTRACT

The outlet opening of the air chest is provided with a sleeve for supporting the organ pipe externally of the chest and which acts as a valve seat for the flexible resilient diaphragm of the chest valve. The diaphragm forms one wall of an auxiliary chamber located beneath the sleeve. An electro-magnetic valve controls the communication of the auxiliary chamber to the atmosphere or the air under pressure in the chest. When the auxiliary chamber is in communication with the interior of the air chest the pressures on opposite sides of the diaphragm are equalized around the sleeve and the pressure differential between the atmospheric pressure in the sleeve and the air under pressure in the auxiliary chamber maintains the diaphragm in sealing engagement with the sleeve. When the auxiliary chamber is in communication with the atmosphere, the pressure differential acting on the diaphragm will move the diaphragm away from the sleeve allowing air under pressure to escape from the chest through the sleeve to the pipe of the organ. The chest valve is preferably mounted on the underside of the air chest externally thereof with the diaphragm exposed to the interior of the chest for cooperation with the sleeve.

4 Claims, 6 Drawing Figures

INVENTOR
PAUL A. KLANN

BY Sughrue, Rothwell, Mion, Zinn & Macpeak
ATTORNEYS

PATENTED MAR 5 1974
3,795,170
SHEET 2 OF 3
FIG.3
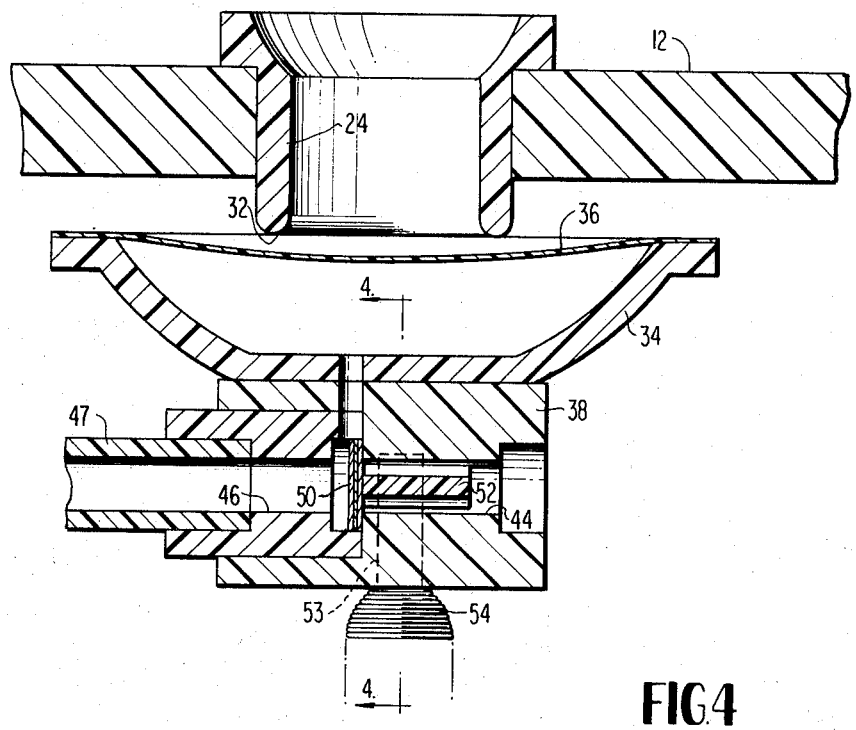
FIG.4
FIG.5
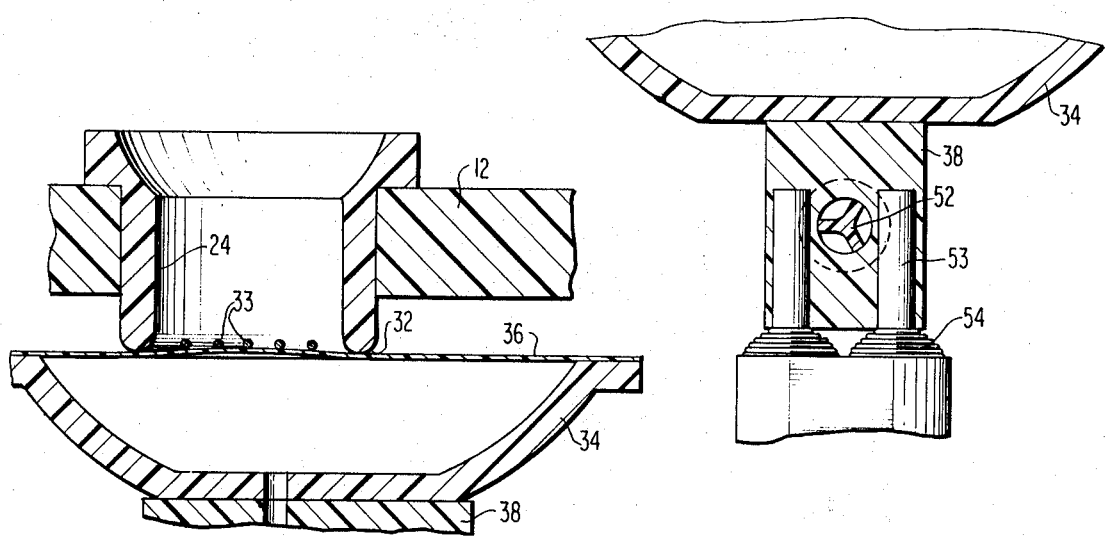
INVENTOR
PAUL A. KLANN
BY Sughrue, Rothwell, Mion, Zinn & Macpeak
ATTORNEYS

CHEST VALVE FOR PIPE ORGANS

This application is a continuation-in-part of application Ser. No. 152,304, filed June 11, 1971, and now abandoned.

BACKGROUND OF THE INVENTION

1. Field of the Invention

The present invention is directed to a valve construction and more specifically to a valve construction in combination with the air chest of a pipe organ for controlling the flow of air under pressure to the pipes of the organ.

2. Prior Art

Most prior art chest valves utilized a composite pad type valve member which was pivotally mounted within the air chest. The valve member was usually spring biased into engagement with the interior surface of the air chest surrounding the outlet aperture and electromagnetic means were provided for overcoming the force of the spring to move the valve member away from the aperture to allow air under pressure to enter the particular organ pipe. Each of these valve members was generally comprised of two pieces of leather bonded to opposite sides of a felt or sponge type pad. Even though the leather covered pad was fairly flexible the achievement of a good seal was often difficult, especially when the leather aged and began to dry out. This type of prior art chest valve arrangement involved a large number of parts which were costly and time consuming to assemble and which often proved to be unreliable in operation.

Other types of prior art chest valves disposed within the air chest, mounted the composite valve member on a flexible diaphragm, usually of leather, which relied upon a pressure differential to move the valve pad into and out of engagement with the surface of the chest surrounding the outlet aperture. This type of valve arrangement generally relied upon spring means to supplement the differential air pressure to seat the valve pad and also required an externally mounted valve member to control the pressure differential being applied to the leather diaphragm. Such arrangements were also costly and time consuming to assemble and due to the large number of elements were generally unreliable. Furthermore, since the chest valve was located within the air chest, the chest valve was difficult to service or replace and required the opening of the air chest.

SUMMARY OF THE INVENTION

The present invention provides a chest valve for pipe organs which is extremely simple in construction and reliable in operation. The present valve construction does not require any spring nor does it require any pivoted members, thereby substantially reducing the material cost as well as the assembly time and cost. The reduction in parts, correspondingly increases the reliability of the valve.

The chest valve, according to the present invention is comprised of a sleeve which is adapted to be inserted in the outlet aperture of an air chest. The inner circumferential edge of the sleeve is normally disposed in contact with a flexible plastic diaphragm which forms one wall of an auxiliary chamber and which is exposed to the air pressure within the air chest. Conduit means are provided whereby the auxiliary chamber may communicate directly with the atmosphere or the interior of the air chest. Valve means are provided for controlling the communication to the auxiliary chamber which are operable in one direction by the air under pressure within the chest and by electro-magnetic means in the opposite direction. With the electro-magnet de-energized, the air pressure in the chest will move the control valve to the position closing communication between the auxiliary chamber and the atmosphere and allowing air under pressure to enter the auxiliary chamber. Since the air within the sleeve is at atmospheric pressure, the air under pressure within the auxiliary chamber will force the diaphragm into tight sealing engagement with the edge of the sleeve. Upon energization of the electro-magnet, the control valve member will be shifted to block the flow of air under pressure into the auxiliary chamber and allow the auxiliary chamber to communicate directly to the atmosphere. The air under pressure acting on the external surface of the diaphragm will depress the diaphgram inwardly into the auxiliary chamber causing the diaphragm to separate from the sleeve, thereby allowing air under pressure to escape from the chest through the sleeve into the organ pipe causing the pipe to speak. The chest valve, including the auxiliary chamber and electromagnetically controlled valve means may be disposed completely within the air chest or completely exteriorly of the air chest with the diaphragm closing an aperture in the bottom of the air chest.

BRIEF DESCRIPTION OF THE DRAWINGS

FIG. 3 is a detailed sectional view similar to FIG. 2 but with the electro-magnet energized.

FIG. 4 is a sectional view along the line 4—4 in FIG. 3.

FIG. 5 is a partial sectional view of the diaphragm valve modification.

DETAILED DESCRIPTION OF THE INVENTION

Figure 1:
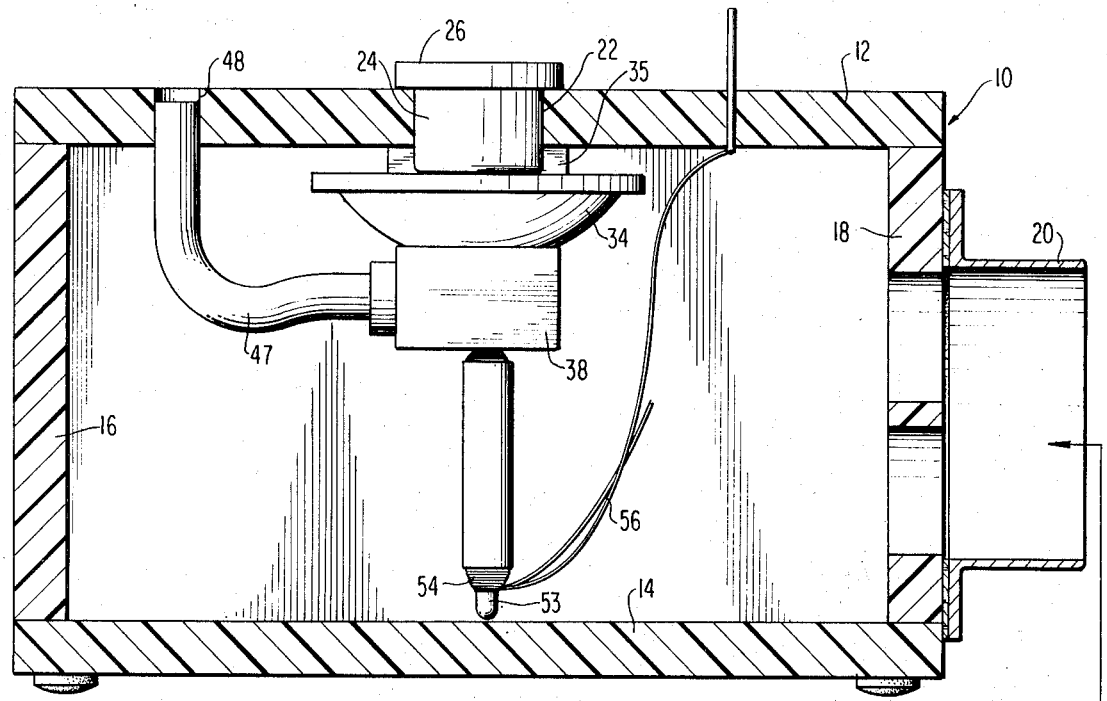
FIG. 1 is a side elevational view, partly in section, showing an embodiment with the chest valve disposed within the air chest.

The chest valve arrangements shown in the drawings have been illustrated for only a single pipe and the dimensions of the chest 10 have been chosen only for purposes of illustrating the invention. The usual chest 10 is constructed as a wooden box having a top 12, a bottom 14 and sides 16 and 18. A conduit 20 communicates with one or more apertures in the side 18 and may be connected to a blower 21 which will supply air under pressure to the interior of the chest 10.

Since each pipe organ has a plurality of pipes, the present invention will be repeated for each pipe but only a single pipe and valve arrangement will be described for purposes of illustration. A circular aperture 22 is formed through the top 12 of the chest 10 for the reception of a tubular sleeve 24. The sleeve 24 is provided with an annular shoulder 26 which rests on the upper surface of the top 12. The internal surface of the sleeve adjacent the shoulder 26, is beveled at 28 for receiving and mounting the lower end of a pipe 30. The end of the sleeve 24 within the chest 10 is rounded to provide a circular valve seat 32 having a small annular surface area.

A bowl shaped member 34 is mounted by any suitable means such as bracket 35 directly beneath the sleeve 24 with the circular upper edge of the bowl 34 being substantially concentric and co-planar with the circular valve seat 32. A thin sheet or diaphragm 36 of plastic material or any other suitable resilient material such as rubber or leather is secured in taut condition to the upper edges of the bowl 34 by any suitable means such as an adhesive to form an auxiliary chamber 37. As a practical matter, the circular valve seat 32 should extend very slightly below the upper edge of the bowl 34 so that the diaphragm 36 will bear against the circular valve seat 32 in the absence of any differential of air pressure on opposite sides of the diaphragm.

A valve body 38 is secured to the lower surface of the bowl 34. A passage 40 extends between the interior of the bowl 34 and a valve chamber 42 formed in the valve body 38. Two other passages 44 and 46 are disposed in substantial axial alignment with each other and communicate with the valve chamber 42. The passage 44 is disposed in direct communication with the interior of the chest 10, whereas the passage 46 is disposed in communication with the atmosphere by means of a conduit 47 connected between the passage 46 and an aperture 48 in the chest 10. A valve disc 50 having a peripheral configuration complementary to the valve chamber 42, is freely mounted for reciprocating movement in the valve chamber 42 between the passage 44 and the passage 46. The valve member 50 may be constructed as a metal disc covered with leather or any other suitable resilient material which will provide a good seal when it is disposed in sealing engagement with the interior of the chamber 42 around one of the passages 44 or 46. A valve stem 52 of non-magnetic material such as plastic is secured to the center of the valve disc 50 and extends into the passage 44. The stem 52 guides the valve disc 50 to prevent the valve disc from binding within the chamber 42. A U-shaped magnet 53 is disposed with the legs thereof on opposite sides of the valve block 38 adjacent the metallic valve disc 50. Suitable windings 54 may be provided on the legs of the magnet 52 with the leads 56 extending outwardly through the chest wall to a suitable control.

Figure 2:
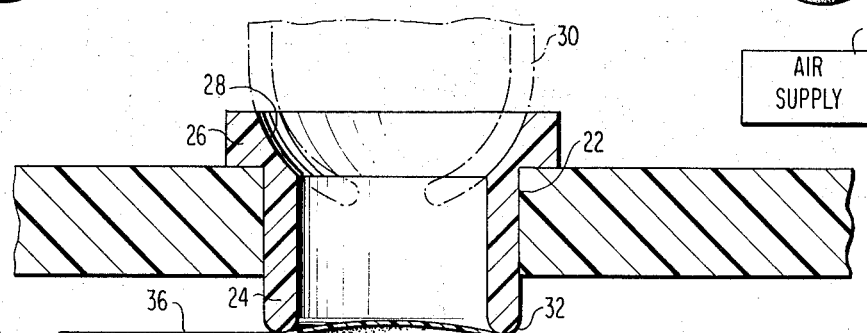
FIG. 2 is a detailed sectional view of the valve in FIG. 1 with the electro-magnet de-energized.
Figure 2:
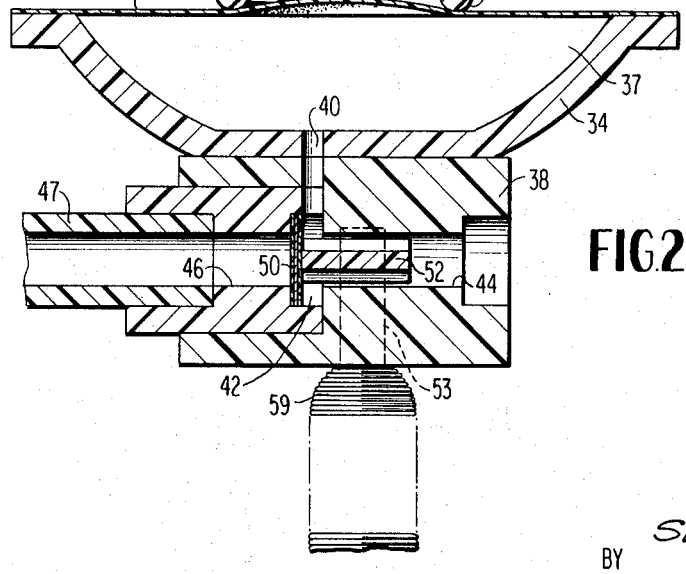

In operation, air under pressure is supplied to the interior of the chest 10 through the fitting 20. This air under pressure will enter the passage 44 and force the valve disc 50 into sealing relation with respect to the passage 46 to close off communication to the atmosphere and to allow the air under pressure to enter the auxiliary chamber formed by the bowl 34 and disphragm 36 through the passage 40. Thus, the annular surface of the diaphragm 36 surrounding the valve seat 32, will have equal pressures on opposite sides thereof. However, the pipe 30 and the sleeve 24, communicate with the atmosphere under these conditions and the differential in pressure on the diaphragm in the area defined by the valve seat 32, will force the diaphragm upwardly into tight sealing engagement with the valve seat 32. Under these conditions, as shown in FIG. 2, no air under pressure will enter the pipe 30 and no sound will be produced. A suitable grating 33 (FIG. 5) may be provided within the sleeve 24 adjacent the valve seat 32 to prevent undue bowing of the diaphragm upwardly into the sleeve.

Upon energization of the coils 54 of the electromagnet 53 by the closing of a switch in response to the depression of a key on the organ console, the valve disc 50 will be attracted to the electro magnet 53 to shift the valve disc 50 against the air pressure into engagement with the surface of the valve chamber 42 surrounding the passage 44. Thus, as shown in FIG. 3, air under pressure can no longer enter the auxiliary chamber and the auxiliary chamber will be disposed in communication with the atmosphere through the passage 40, valve chamber 42, passage 46, conduit 47 and aperture 48. The differential in air pressure on the annular area of the diaphragm 36 surrounding the valve seat 32 will now cause the diaphragm 36 to bow inwardly into the bowl 34 allowing air under pressure to pass around the valve seat 32 and out through the sleeve and pipe 30 to produce the desired sound.

FIG. 5 shows a modification of the arrangement of the bowl 34 and diaphragm 36 relative to the sleeve 24 and valve seat 32. According to this modification the circular diaphragm 36 and the circular valve seat 32 are no longer concentric to each other but are offset a substantial amount so that the portion of the diaphragm 36 having the greatest radial dimension between the valve seat 32 and the edge of the bowl 34 will separate from the valve seat 32 first. Thus, it is possible to achieve a gradual flow of air from the interior of the chest 10 into the pipe 30 as opposed to the arrangement shown in FIGS. 1 and 2 wherein the diaphragm is separated from all points of the valve seat at once.

Figure 6:
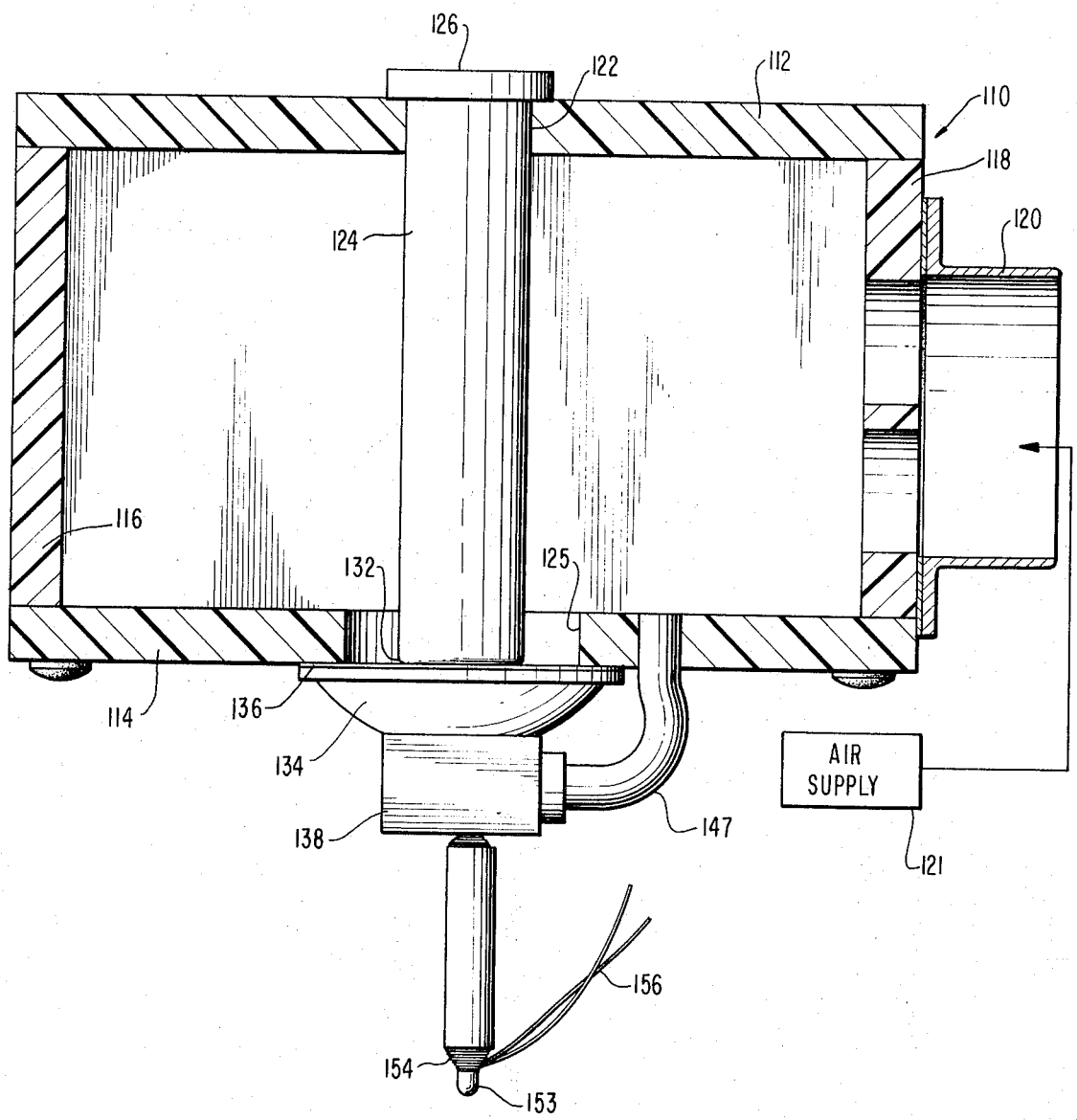
FIG. 6 is a side elevational view, partly in section, showing another embodiment with the chest valve disposed outside the air chest.

In the embodiment shown in FIG. 6 the valve structure, per se, is identical to the valve structure shown in the previous embodiment with the primary difference being in the location of the valve exteriorly of the air chest. As in the previous embodiment, the chest is comprised of a top 112, a bottom 114 and side members 116 and 118. A conduit 120 communicates with one or more apertures in the side 118 and may be connected to a blower 121 which will supply air under pressure to the interior of the chest 110.

As in the previous embodiment only a single pipe and valve arrangement will be described but the arrangement may be repeated for each of the plurality of pipes ordinarily associated with an air chest. A circular aperture 122 is formed through the top 112 of the chest 110 for the reception of a tubular sleeve 124 which extends entirely through the air chest. The sleeve 124 is provided with an annular shoulder 126 which rests on the upper surface of the top 112. The internal surface of the sleeve adjacent the shoulder 126 is beveled as in the previous embodiment for receiving and mounting the lower end of a pipe. The opposite end of the sleeve 124 extends through an aperture 125 in the bottom 114 of the air chest and is rounded to provide a circular valve seat 132 similar to the valve seat 32 shown in FIG. 2.

A bowl shaped member 134 is mounted by any suitable means such as screws or the like (not shown) to the undersurface of the bottom 114 directly beneath the aperture 125. A thin sheet, or diaphragm 136, of plastic material or any other suitable resilient material such as rubber or leather is secured in taut condition to the upper edges of the bowl 134 by any suitable means such as an adhesive to form an auxiliary chamber similar to the chamber 37 shown in FIG. 2. The valve seat 132 is normally disposed in communication with the diaphragm 136 in the same manner as the previous embodiment and the sleeve 124 may be disposed concentrically or eccentrically relative to the circular diaphragm as shown in FIGS. 2 and 5 respectively. As in the previous embodiment, the circular valve seat 132 should extend very slightly below the upper edge of the bowl 134 so the diaphragm 136 will bear against the circular valve seat 132 in the absence of any differential of air pressure on opposite sides of the diaphragm. An annular space is defined between the aperture 125 and the sleeve 124 to allow the pressure within the air chest 110 to act on the upper surface of the diaphragm 136.

A valve body 138 is secured to the lower surface of the bowl 134 and is constructed in an identical manner to the valve body 38 shown in FIG. 2. The magnet 153 and the coil 154 having leads 156 are also arranged in a manner identical to that shown in the embodiment of FIG. 2 to provide a means for operating the valve within the valve body 138. In the embodiment of FIG. 2, the conduit 47 communicated the passage 46 of the valve body 38 to the atmosphere and the passage 44 was exposed to the air pressure within the chest since the valve arrangement was located within the inner chest. However, in the present embodiment, a conduit 147 is connected to the valve body 138 in a manner opposite the manner in which the conduit 47 is connected to the valve body 38. Thus, the conduit 147 communicates one side of the valve member within the valve body 138 to the pressure within the air chest and the opposite side of the valve member within the valve body 138 is exposed to the atmosphere.

In the operation of the embodiment shown in FIG. 6, the air under pressure within the air chest 110 is normally communicated through the conduit 147 to shift the valve similar to the valve 50 shown in FIG. 2 to the left, thereby allowing the air under pressure to communicate with the chamber formed within the bowl 134 and the diaphragm 136. The pressures will be equalized on the diaphragm in the annular area surrounding the sleeve 124 but the pressure differential between the diaphragm chamber and the interior of the sleeve 124 is such that the diaphragm will be firmly held against the valve seat 132. Upon the selection and operation of a predetermined key, the coil 154 will be energized to shift the valve member within the valve body 138 to close off the conduit 147 and allow the interior of the diaphragm chamber to be exhausted to the atmosphere. The pressure differential existing on the diaphragm will then depress the diaphragm within the bowl 134 allowing the air pressure within the chest 110 to pass through the sleeve 124 and into the pipe resting thereon. By arranging the diaphragm valve and the control valve 138 of a single unit beneath each pipe support exteriorly of the air chest, it is extremely easy to repair or replace the valve unit. In the past, it was always necessary to open up the air chest in order to serve the valves located within the air chest which always created a problem since it was necessary to reseal the air chest after the servicing operation. The present arrangement provides a compact unitary control arrangement which is extremely accessible and simple, both in operation and servicing.

The valves according to both embodiments of the invention are suitable for use with a Pitman chest, a ventil chest, a direct elective chest or unit valve chest. The valve of each embodiment utilizes a resilient diaphragm which not only defines the chamber or pouch for controlling the operation of the valve but also acts as the valve member and the return spring thus reducing the need for a plurality of individual elements to accomplish these functions.

While the invention has been particularly shown and described with reference to the preferred embodiments thereof, it will be understood by those skilled in the art that various changes in form and details may be made therein without departing from the spirit and scope of the invention.

What is claimed is:

1. A chest valve for pipe organs comprising an air chest for holding a supply of air under pressure, at least one aperture in the top of said chest leading to an organ pipe, a second aperture in the bottom of said chest disposed in alignment with said one aperture, sleeve means disposed in said one aperture and extending through said chest and said second aperture to define an annular valve seat on the end extending through said second aperture, an auxiliary pipe control unit for each pipe secured beneath said second aperture outside said chest comprising auxiliary chamber means, a taut thin flexible resilient diaphragm forming one wall of said chamber and normally disposed in sealing relation across said valve seat when the air pressure in said chest and said chamber are equal, a valve body secured directly to said chamber means outside said chest, first passage means connecting the interior of said chest to the interior of said chamber, second passage means connecting the interior of said chamber to atmosphere, valve means in said valve body disposed between said chamber and said first and second passage means, said valve means normally disposed to maintain said chamber in communication with said chest through said first passage means while closing said second passage means, and operator controlled means for shifting said valve means to open communication between said chamber and atmosphere through said second passage and to close said first passage whereby the pressure differential acting on said diaphragm will shift said diaphragm away from said valve seat to allow air under pressure to enter said pipe through said sleeve.

2. A chest valve as set forth in claim 1 wherein said diaphragm and said valve seat are circular and disposed concentrically with respect to each other.

3. A chest valve as set forth in claim 1 wherein said diaphragm and said valve seat are circular and disposed with their centers offset from each other to provide a gradual opening of said valve.

4. A chest valve as set forth in claim 1 wherein said valve means is comprised of a free floating valve disc reciprocable between said first and second passage means whereby air under pressure in said chest will normally maintain said valve disc in sealing engagement with said second passage means, said valve disc including magnetically responsive means and electromagnetic means disposed adjacent said first passage means whereby upon energization of said electromagnetic means said valve disc will shift into sealing engagement with said first passage means.

* * * * *